Patented Feb. 11, 1947

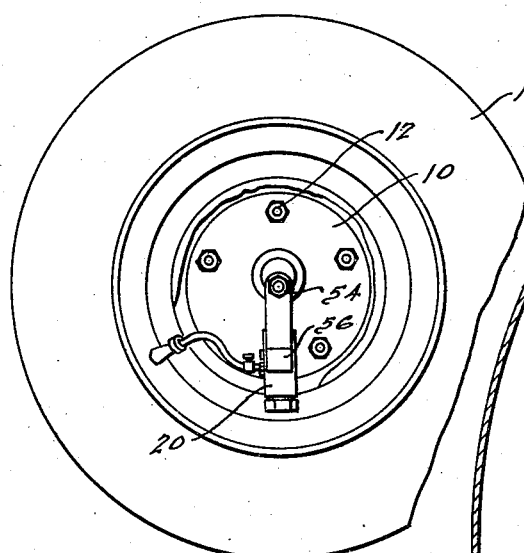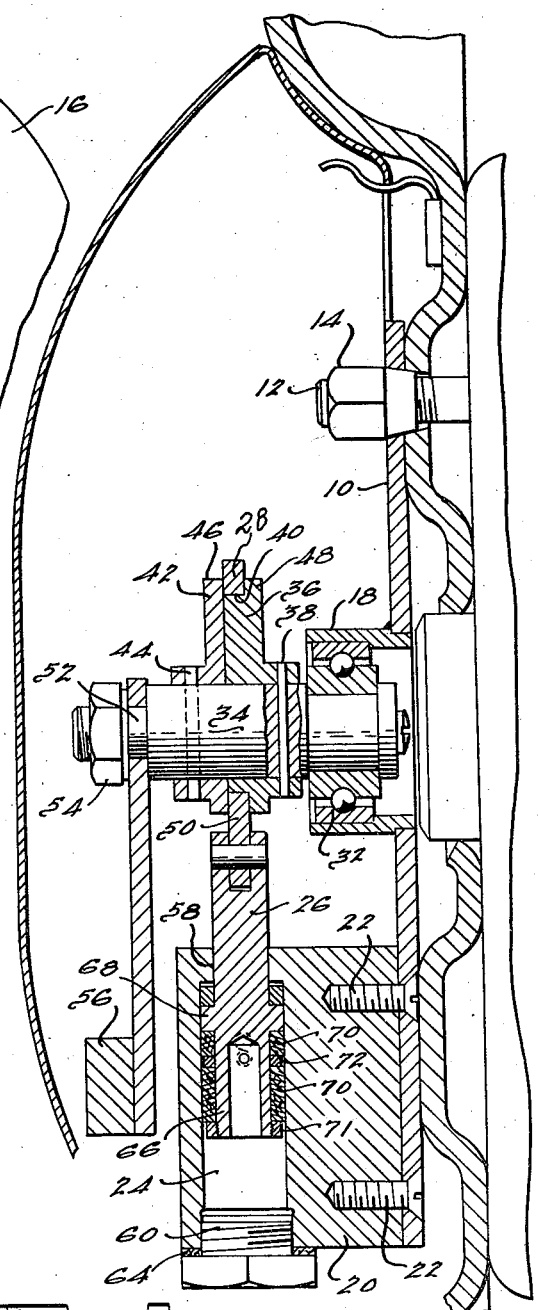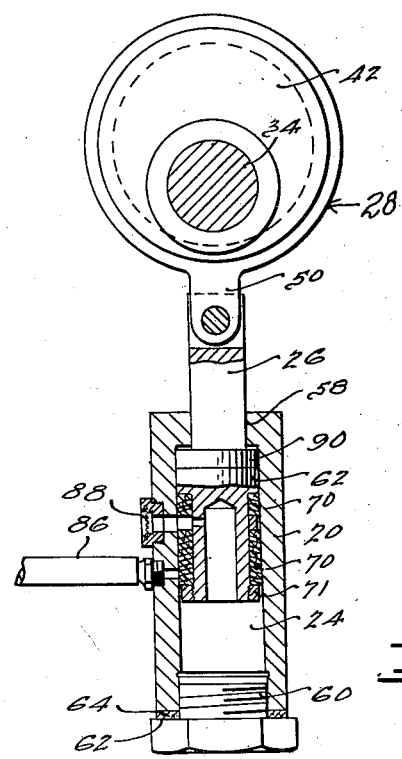

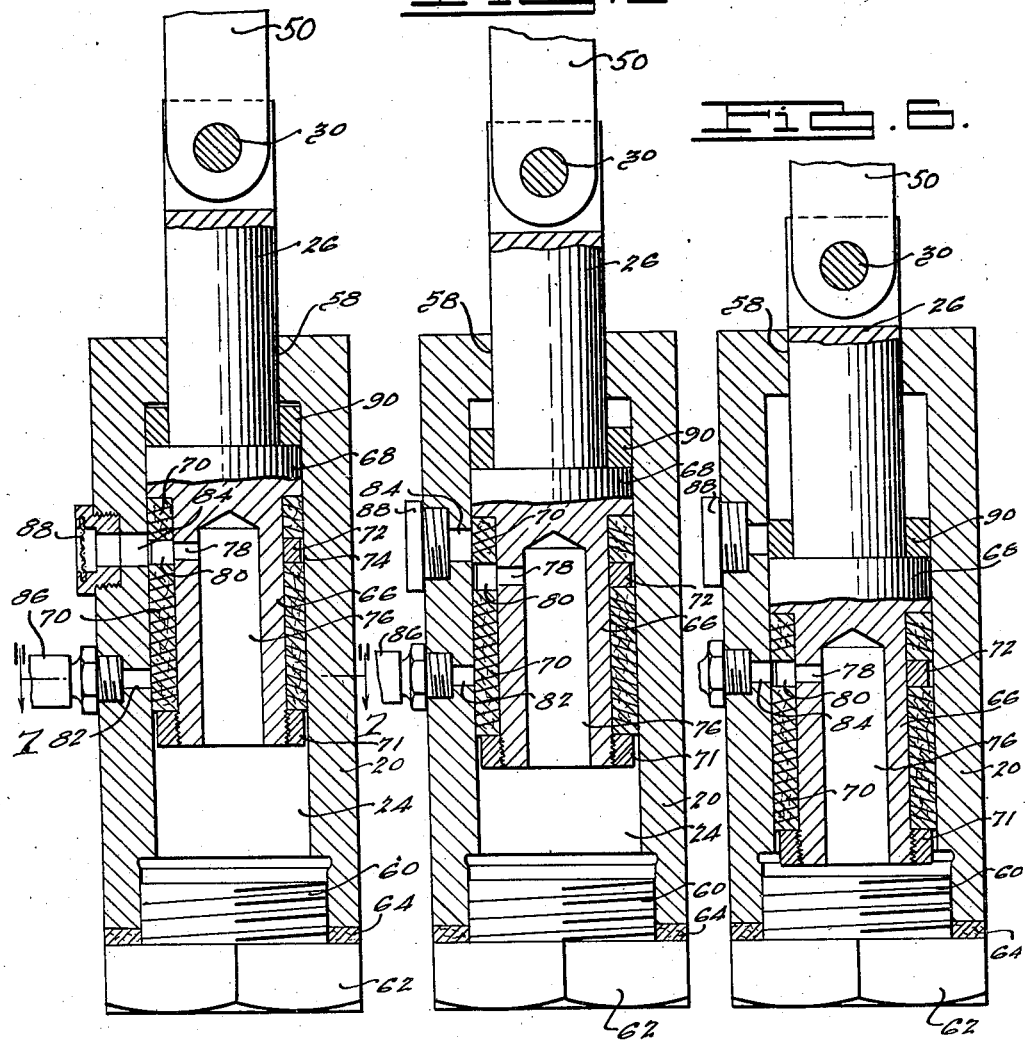
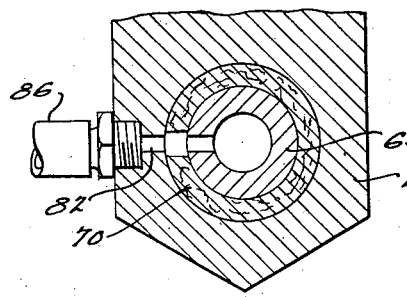

2,415,618

UNITED STATES PATENT OFFICE 2,415,618

PUMP

William S. West, Chicago, Ill.

Application May 21, 1945, Serial No. 595,021

2 Claims. (Cl. 230—172)

This invention relates to a pump and more particularly to a pump for producing and maintaining a predetermined pressure in a pressure line or pressure storage receptacle.

More specifically the invention is an improvement of the pump and valve mechanism disclosed and claimed in my co-pending application, Serial Number 576,848, filed February 8, 1945.

An object of the invention is to provide a reciprocating plunger which produces a predetermined pressure in a co-operating cylinder and to provide a valve mechanism for releasing the pressure at the end of the plunger stroke.

Another object of the invention is to provide an adjustment for predetermining the amount of pressure produced by the reciprocating plunger.

A further object of the invention is to provide an arrangement of valves which will release an excessive pressure to the atmosphere.

A further object of the invention is to provide a pump and pressure regulating valves of inexpensive construction having a minimum number of parts.

Other objects and advantages of the invention will more fully appear from the following description taken in connection with the accompanying drawings in which—

Fig. 1 is a side elevation of an automobile wheel having a pneumatic tire thereon showing one adaptation of my invention, parts being broken away;

Fig. 2 is an enlarged sectional view taken on line 2—2 of Fig. 1 showing a portion of the wheel;

Fig. 3 is a sectional view taken on line 3—3 of Fig. 2;

Figs. 4, 5 and 6 are enlarged sectional views of the pump showing respectively three positions of the piston, the intake position, neutral position and pressure position.

Fig. 7 is a sectional view taken on line 7—7 of Fig. 4.

This invention has been illustrated as applied to an automobile wheel for automatically inflating a tire while it is mounted on the axle and during its rotation. It is to be understood however that the pump has utility in many other installations where it is desired to produce a pressure and to maintain a predetermined pressure.

In the form of the device selected for illustrating my invention, I have provided an annular plate 10 which is detachably received over studs 12 and held in position by nuts 14 which normally retain a wheel 16 on a hub. At the center of the plate 10 and coaxial with the axle of the wheel, I have provided a bearing housing 18, shown as a sleeve welded to the plate 10. A housing 20 is secured to the plate 10 by screws 22. The housing 20 is provided with a bore extending radially of the plate 10, hereinafter referred to as the cylinder 24.

A piston 26 is fitted in the cylinder 24 for reciprocation therein and is provided with a connecting rod 28 pivotally mounted on a pin 30 extending through a bifurcated end of the piston 26 and the connecting rod 28.

A bearing 32 is fitted in the bearing housing 18 and rotatably supports a shaft 34. The shaft 34 receives a collar 36 which is fixed to the shaft 34 by a pin 38. An opening 40 is formed in the connecting rod 28 and is rotatably mounted on the surface of the collar 36 which is eccentric to the axis of the shaft 34. Another collar 42 is secured to the shaft 34 by a pin 44 which positions the connecting rod 28 between flanges 46 and 48.

At the outer end of the shaft 34 and attached to the connection rod 28, is an arm 50 which is secured on a reduced portion 52. The arm 50, at its outer end is provided with a weight 56 which may be welded to the arm 50.

The weight 56, shaft 34, and eccentric collar 36 are held in a nonrotative position by the weight 56 and the plate 10, housing 20, piston 26 and connecting rod 28 are rotatably carried around the shaft 34 and eccentric collar 36 thereby causing reciprocation of the piston 26 in the cylinder 20 when the automobile wheel is rotating.

Referring to Figs. 4, 5 and 6, the piston is shown in three different positions of its reciprocating movement. The housing 20 is provided with the cylinder 24 and at one end thereof has an opening 58 through which the outer end of the piston 26 projects. The opposite end of the housing 20 is open to the cylinder 24 and is internally threaded to receive a screw-threaded plug 60 having a flange 62. A gasket 64 is arranged between the end of the housing 20 and the flange 62. The gasket is of a compressible material to permit sealing between the plug and housing and yet permit limited turning of the plug in its sealed position for adjusting the capacity of the chamber 24 by the axial movement of the plug in the open end of the housing 20.

The piston 26 has a portion 66, within the cylinder 24, of less diameter than the diameter of the cylinder and has an annular flange portion 68 of a diameter to fit the cylinder 24. Between the end of the piston and the flange 68 there is provided a plurality of packing rings 70 which form a seal between the portion 66 and the cylinder 24. A nut 71 screw-threaded on the end of the portion 66 secures the packing rings 70 in position. A ring 72 around the portion 66 is located between the packing rings and has its outer diameter of such dimension to provide an annular space 74 between the ring 72 and the inner surface of the cylinder 24.

A chamber 76 is formed in the portion 66 of the piston and is open to the chamber 24. A radially extending passage 78 is formed in the piston forming a communication between the chamber 76 and the space 74 through a cut-away portion 80 in the ring 72 axially spaced passages 82 and 84 are formed in the wall of the piston housing 20. The one passage 82 is a pressure outlet passage and has a tubular connection 86 leading to the valve stem of the tire. The other passage 84 is the inlet passage and has a filter 88 over the open end to the atmosphere.

Referring now to the operation of the mechanism, the piston 26 is reciprocated in the cylinder 24 by its rotation around the eccentric 36 held stationary by the weight 56. In Fig. 4, the piston 26 is shown in the intake position with the ring 72 positioned in radial alignment with the opening 84. The chamber 24 is subjected to atmospheric pressure through chamber 76, passage 78, cut-away portion 80 of the ring 72, annular space 74 and inlet passage 84. As the piston is moved inwardly of the cylinder as shown in Fig. 5, the inlet passage 84 is sealed off by the packing 70 on one side of the ring 72 and since the packing 70 at the opposite side of the ring 72 seals the exhaust passage 82, the chamber 24 is sealed and further inward movement of the piston 26 compresses the air in the chamber 24. The pressure continues to increase until the piston reaches the position shown in Fig. 6 where the ring 72 is in radial alignment with the exhaust passage 82. At the time the space 74, around the ring, reaches the passage 82, the pressure is expelled through chamber 76, passage 78m space 74, cut-away portion 80, passage 82 and connection 86 to the tire. At this point the pressures in the tire and chamber 24 are balanced. A sealing ring 90 is positioned around the piston 26 adjacent the flange 68 for closing off the opening 84.

Assuming that the chamber is designed and adjusted to produce a pressure of 30 pounds, the pump will continue to deliver a 30 pound pressure. A pressure exceeding 30 pounds will then be in the chamber 24. Since the chamber 24 becomes open to atmospheric pressure at the opposite end of its stroke, and the tire pressure is sealed off from the chamber 24, the pump will only deliver 30 pounds on each pressure stroke. If the tire pressure should become 32 pounds, as might be caused by a higher temperature, the two pounds above the pump pressure will be delivered to the chamber 24 when the piston is in the position shown in Fig. 6 and returned to the atmospheric pressure when the piston is in the position shown in Fig. 4. Thus it will be seen that the pump maintains a predetermined pressure in a chamber where a pressure is desired.

It will be noted that the exhaust passage is not in communication with the chamber 24 until the maximum pressure has been reached within the chamber 24 at the end of the pressure stroke and that it is immediately closed off upon the start of the stroke in the opposite direction. Thus, the maximum pressure is delivered to the tire intermittently.

It will be understood that various changes including the size, shape and arrangement of parts may be made without departing from the spirit of my invention and it is not my intention to limit its scope other than by the terms of the appended claims.

I claim:

1. A pump comprising a housing having a cylinder therein, a piston reciprocable in said cylinder, a chamber in said piston communicating with said cylinder, axially spaced inlet and outlet passages in the wall of said housing, said piston having a passage through the wall thereof forming a communication between said chamber and one of passages when the piston is at one end of its stroke and a communication between said chamber and the other of said passages when the piston is at the other end of its stroke, and packing material around the outer periphery of said piston having an axial dimension greater than the space between said inlet and outlet passages and at the opposite sides of the passage in said piston wall communicating with said chamber.

2. A pump comprising a housing having a cylinder therein, a piston reciprocable in said cylinder, a chamber in the end of said piston open to said cylinder, a passage in the wall of said piston and spaced axially of said piston from the end thereof, a ring around the wall of said piston having a cut away portion in radial alignment with said passage, packing material around the outer periphery of said piston at the opposite sides of said ring, and inlet and outlet passages in the wall of said housing, said inlet and outlet passages being axially spaced a distance substantially equal to the length of the stroke of said piston to provide radial alignment of the passage in said piston with said inlet and outlet passages respectively at the ends of the piston stroke.

WILLIAM S. WEST.

REFERENCES CITED

The following references are of record in the file of this patent:

UNITED STATES PATENTS

| Number | Name | Date |
|---|---|---|
| 1,699,236 | Goldrick | Jan. 15, 1929 |
| 1,854,009 | Wilkinson | Apr. 12, 1932 |
| 2,011,166 | Steiner | Aug. 13, 1935 |
| 2,361,153 | Say | Oct. 24, 1944 |